US012565309B2

(12) United States Patent
Kerr et al.

(10) Patent No.:  US 12,565,309 B2
(45) Date of Patent:  Mar. 3, 2026

(54) COMPUTER-IMPLEMENTED METHOD FOR REDUCING TIRE WEAR ON AN AIRCRAFT

(71) Applicant: Airbus Operations Limited, Filton (GB)

(72) Inventors: Sean Kerr, Filton (GB); Mark Johnson, Filton (GB)

(73) Assignee: AIRBUS OPERATIONS LIMITED, Filton (GB)

( * ) Notice: Subject to any disclaimer, the term of this patent is extended or adjusted under 35 U.S.C. 154(b) by 0 days.

(21) Appl. No.: 18/889,012

(22) Filed: Sep. 18, 2024

(65) Prior Publication Data

US 2025/0108911 A1      Apr. 3, 2025

(30) Foreign Application Priority Data

Sep. 28, 2023    (GB) ...................................... 2314921

(51) Int. Cl.
*B64C 13/16*          (2006.01)
*B64C 25/50*          (2006.01)

(52) U.S. Cl.
CPC .............. *B64C 13/16* (2013.01); *B64C 25/50* (2013.01)

(58) Field of Classification Search
CPC ................................ B64C 13/16; B64C 25/50
See application file for complete search history.

(56) References Cited

U.S. PATENT DOCUMENTS

| | | |
|---|---|---|
| 4,613,190 A | 9/1986 | Johnson |
| 8,094,042 B2 | 1/2012 | Read et al. |

| | | |
|---|---|---|
| 9,650,129 B2 | 5/2017 | Cox et al. |
| 9,802,696 B2 | 10/2017 | Garaygay et al. |
| 9,884,679 B2 | 2/2018 | Romana et al. |
| 10,065,729 B2 | 9/2018 | Howell et al. |
| 10,580,316 B2 | 3/2020 | Morellec et al. |
| 10,730,352 B2 | 8/2020 | Makke et al. |
| 11,390,380 B2 | 7/2022 | Forghani et al. |
| 11,407,524 B2 | 8/2022 | Fernandes et al. |
| 2019/0118940 A1* | 4/2019 | Dupre .................. G05D 1/0202 |
| 2021/0107634 A1 | 4/2021 | Forghani et al. |
| 2022/0363406 A1 | 11/2022 | Howell et al. |

FOREIGN PATENT DOCUMENTS

| | | |
|---|---|---|
| CN | 114313234 A | 4/2022 |
| EP | 3805098 A1 | 4/2021 |
| FR | 2963606 A1 | 2/2012 |
| KR | 1020190048319 A | 11/2020 |
| WO | 2019239261 A1 | 12/2019 |

OTHER PUBLICATIONS

Extended European Search Report from corresponding European application 24197813.9, dated Jan. 30, 2025.
United Kingdom Search Report for corresponding United Kingdom Patent Application No. 2314921.4 dated Feb. 29, 2024.

* cited by examiner

*Primary Examiner* — Rodney A Bonnette
(74) *Attorney, Agent, or Firm* — Greer, Burns & Crain, Ltd.

(57)          ABSTRACT

A computer-implemented method that includes receiving information indicative of an aircraft steering angle of an aircraft, comparing the received information against a threshold above which degradation of a tire of a landing gear of the aircraft is expected to occur and causing an action to be performed based on a result of the comparison. Also an aircraft system.

17 Claims, 4 Drawing Sheets

100

102 — Receiving information

104 — Calculating threshold

106 — Comparing information

108 — Causing an action

110 — Storing data

112 — Obtaining stored data

114 — Analysing stored data

100

102 — Receiving information

104 — Calculating threshold

106 — Comparing information

108 — Causing an action

110 — Storing data

112 — Obtaining stored data

114 — Analysing stored data

200

202    Receiving information

204    Calculating threshold

206    Comparing steering angle
       against threshold

208    Causing an action

COMPUTER-IMPLEMENTED METHOD FOR REDUCING TIRE WEAR ON AN AIRCRAFT

CROSS-REFERENCES TO RELATED APPLICATIONS

This application claims the benefit of Great Britain Patent Application Number 2314921.4 filed on Sep. 28, 2023, the entire disclosure of which is incorporated herein by way of reference.

FIELD OF THE INVENTION

The present invention relates to a method, an aircraft system, a non-transitory computer-readable storage medium and an aircraft.

BACKGROUND OF THE INVENTION

During movement of an aircraft on the ground, tires of a landing gear of the aircraft may be subject to forces that wear the tires and reduce their lifetime. It may be desirable to reduce the amount of wear the tires of the aircraft landing gear are subject to.

SUMMARY OF THE INVENTION

According to a first aspect, there is provided a computer-implemented method comprising: receiving information indicative of an aircraft steering angle of an aircraft; comparing the received information against a threshold above which degradation of a tire of a landing gear of the aircraft is expected to occur; and causing an action to be performed based on a result of the comparison.

By comparing the information indicative of the aircraft steering angle against the threshold, it may be possible to determine whether the aircraft steering angle has exceeded, or will exceed, the threshold. This information can then be used to alter operation of the aircraft to minimize, or eliminate, the amount of time that the aircraft steering angle spends above the threshold. The method according to the first aspect may also help to reduce degradation of one or more tires of the aircraft landing gear by taking some form of relevant action based on the comparison. This may help to increase the overall lifetime of the tires. As the overall lifetime of the tires may be improved, this may reduce maintenance costs of the aircraft landing gear as the tires may not need to be replaced as often as if the method of the first aspect was not used.

The aircraft steering angle may comprise a steering angle of a nose landing gear of an aircraft and the tires of the aircraft landing gear may be tires of the nose landing gear. The aircraft steering angle may comprise a steering angle of a main landing gear of the aircraft and the tires of the aircraft landing gear may be tires of the main landing gear. The steering angle may be an angle of the landing gear relative to a longitudinal axis (otherwise known as a roll axis) of the aircraft. The longitudinal axis comprises an axis that passes through the aircraft from a nose of the aircraft to a tail of the aircraft and is substantially parallel with the ground when the aircraft is on the ground.

The computer-implemented method may comprise receiving, at an on-board aircraft system, the information indicative of the aircraft steering angle. The on-board aircraft system may comprise a computer and the computer-implemented method may comprise receiving, at the computer, the information indicative of the aircraft steering angle. The computer-implemented method may comprise comparing the received information against the threshold using the on-board aircraft system. This may allow the comparing to be carried out on-board the aircraft, without the need to transmit data away from the aircraft. The computer-implemented method may comprise causing the action to be performed using the on-board aircraft system. The on-board aircraft system may output a signal in dependence on the comparison to cause the action to be performed.

The computer-implemented method may comprise receiving, at a remote computing device, the information indicative of the aircraft steering angle. The remote computing device may be located remote from the aircraft. The computer-implemented method may comprise comparing the received information against the threshold at the remote computing device. This may allow the comparison to be carried out remote from the aircraft, which may reduce the computational load of systems on-board the aircraft. The computer-implemented method may comprise causing the action to be performed using the remote computing device. The remote computing device may output a signal in dependence on the comparison to cause the action to be performed.

The information indicative of the aircraft steering angle may comprise a measured steering angle of the aircraft. This may allow an actual steering angle of the aircraft to be used for the comparison, which may improve the overall accuracy of the comparison.

The computer-implemented method may comprise receiving the information indicative of the aircraft steering angle from a sensor attached to the aircraft landing gear. The sensor may comprise a rotary variable displacement transducer (RVDT). The RVDT may be configured to output a signal indicative of the aircraft steering angle.

The computer-implemented method may comprise receiving the information indicative of the aircraft steering angle from a device located within a cockpit of the aircraft. The device may be operable by a flight crew of the aircraft to provide a steering input to change the aircraft steering angle and the information indicative of the aircraft steering angle may comprise the steering input from the flight crew. This may allow the action to be taken before the aircraft steering angle is changed.

The information indicative of the aircraft steering angle may comprise information indicative of a taxiing route of the aircraft. The information indicative of the taxiing route may be provided by the flight crew, for example by being input into an interface in the cockpit. The information indicative of the taxiing route may be received from a source external to the aircraft, such as from a ground controller at an airport. The information indicative of the taxiing route may indicate what the aircraft steering angle will be at different times during the taxiing route. The information indicative of the aircraft steering angle may comprise an expected aircraft steering angle that is determined based on a taxiing route to and/or from a runway.

The information indicative of the aircraft steering angle may comprise a rate of change of the aircraft steering angle. The rate of change of the aircraft steering angle may be used to predict whether the threshold will be exceeded if the current rate of change is maintained. This may allow the action to be performed before the threshold is exceeded.

The computer-implemented method may comprise causing the action to be performed when the steering angle is within a predefined range of the threshold. The predefined range may be a predetermined angle range below the threshold. The predefined range may be between approximately 5 degrees and 25 degrees below the threshold, such as between approximately 10 degrees and 20 degrees below the threshold. This may allow the action to be taken before the threshold is exceeded, which may help to reduce wear on the tires of the aircraft landing gear.

Causing the action to be performed may comprise causing an indication to be output. The indication may be output on a display in a cockpit of the aircraft. The indication may inform the flight crew when the aircraft steering angle is close to, or exceeds, the threshold. The flight crew may then take action to prevent the steering angle exceeding the threshold, or to reduce the amount of time that the aircraft steering angle exceeds the threshold. The indication may comprise a light on the display and the causing the action to be performed may comprise causing a property of the light to change, such as the color of the light, based on the result of the comparison. This may allow an operator, such as a member of flight crew, to quickly and easily see the output.

The indication may be output on a device external from the aircraft. The device external from the aircraft may be located on a vehicle used to assist the aircraft to move on the ground, such as a towing vehicle. The device external from the aircraft may be a handheld device that can be carried around. When the indication is provided on the device external from the aircraft, this may inform an operator of the device that the aircraft steering angle is close to, or exceeds, the threshold. The operator may then take appropriate action, such as moving the towing vehicle to change the aircraft steering angle, to prevent the steering angle from exceeding the threshold, or to reduce the amount of time that the aircraft steering angle exceeds the threshold.

Causing the action to be performed may comprise providing instructions for steering the landing gear of the aircraft during a taxiing procedure of the aircraft. The instructions may be provided by an onboard computer to an aircraft system responsible for controlling movement of the aircraft. The instructions may be configured to minimize the amount of time that the aircraft steering angle will exceed the threshold or to avoid the aircraft steering angle exceeding the threshold. As such, this may help to increase the lifetime of the tires of the aircraft landing gear.

The computer-implemented method may comprise causing the instructions to be automatically carried out by one or more aircraft systems of the aircraft. This may allow the aircraft to substantially autonomously move between a first position and a second position, such as between a gate of an airport and a runway of an airport, while minimizing the time that the aircraft steering angle exceeds the threshold or avoiding the aircraft steering angle exceeding the threshold.

The instructions may be manually carried out by the crew to control movement of the aircraft. The instructions may comprise taxi-way positions and/or turn angles to be carried out during taxiing.

Causing the action to be performed may comprise providing haptic feedback on a device within the cockpit of the aircraft. The device may be a tiller that is used to change the aircraft steering angle. The haptic feedback may require the flight crew to apply an increased force through the device in order to exceed the threshold. This may help to provide a physical indication to the flight crew as to when the threshold is exceeded.

Causing the action to be performed may comprise updating the taxiing route based on the comparison. The taxiing route may be updated by the on-board aircraft system or the remote computing device. The taxiing route may be updated such that when the aircraft follows the updated taxiing route, the aircraft steering angle does not exceed the threshold or the amount of time that the aircraft steering angle exceeds the threshold is minimized. The computer-implemented method may comprise outputting instructions for steering the aircraft landing gear to follow the updated taxiing route. The instructions may be output on the display within the cockpit of the aircraft. This may allow the flight crew to see the instructions and operate the aircraft accordingly to follow the taxiing route. The computer-implemented method may comprise causing the instructions to be automatically carried out by one or more aircraft systems. This may allow the aircraft to substantially autonomously follow the updated taxiing route.

The threshold may comprise an aircraft steering angle of between approximately 30 degrees and 80 degrees relative to the longitudinal axis of the aircraft, such as between approximately 50 degrees and 75 degrees relative to the longitudinal axis of the aircraft. The threshold may comprise an aircraft steering angle that is equal to a maximum possible steering angle of the aircraft.

The computer-implemented method may comprise calculating the threshold. Calculating the threshold may comprise dynamically calculating the threshold based on an input from an aircraft system. The input may comprise information indicative of at least one of a speed of the aircraft and a weight of the aircraft. The weight of the aircraft may be determined based on a load sheet and/or a fuel burn rate. The weight of the aircraft may be determined based on information provided by the flight crew. By dynamically calculating the threshold, this may allow for a more accurate calculation of the threshold at a given point in time.

The threshold may be obtained from a database. The computer-implemented method may comprise calculating the threshold based on at least one of a taxiing route of the aircraft, an ambient environment of the aircraft (such as weather conditions at an airport and/or a runway) and one or more properties of the aircraft. The one or more properties of the aircraft may comprise at least one of a weight of the aircraft, the type of aircraft and the age of tires of the aircraft landing gear.

The computer-implemented method may comprise storing, on a memory, data representative of at least one of the information indicative of an aircraft steering angle and the result of the comparison. The method may comprise transmitting the data to a memory located remote from the aircraft. The memory may be on-board the aircraft or may be remote from the aircraft.

The computer-implemented method may comprise obtaining the stored data from the memory using a computing device and analyzing the data on the computing device. The analysis of the data may be used to inform future decisions regarding taxiing routes to be used to used by aircraft at the airport to minimize the amount of time that the aircraft steering angle exceeds the threshold. The analysis of the data may also be used to guide future airport and/or taxiway design.

According to a second aspect, there is provided an aircraft system configured to: receive information indicative of an aircraft steering angle of an aircraft; compare the received information against a threshold above which degradation of a tire of a landing gear of the aircraft is expected to occur; and cause an action to be performed based on the result of the comparison.

According to a third aspect, there is provided a non-transitory computer-readable storage medium storing instructions that, when executed by an aircraft system, cause the aircraft system to carry out the computer-implemented method according to the first aspect.

According to a fourth aspect, there is provided an aircraft comprising the aircraft system according to the second aspect or the non-transitory computer-readable storage medium according to the third aspect.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
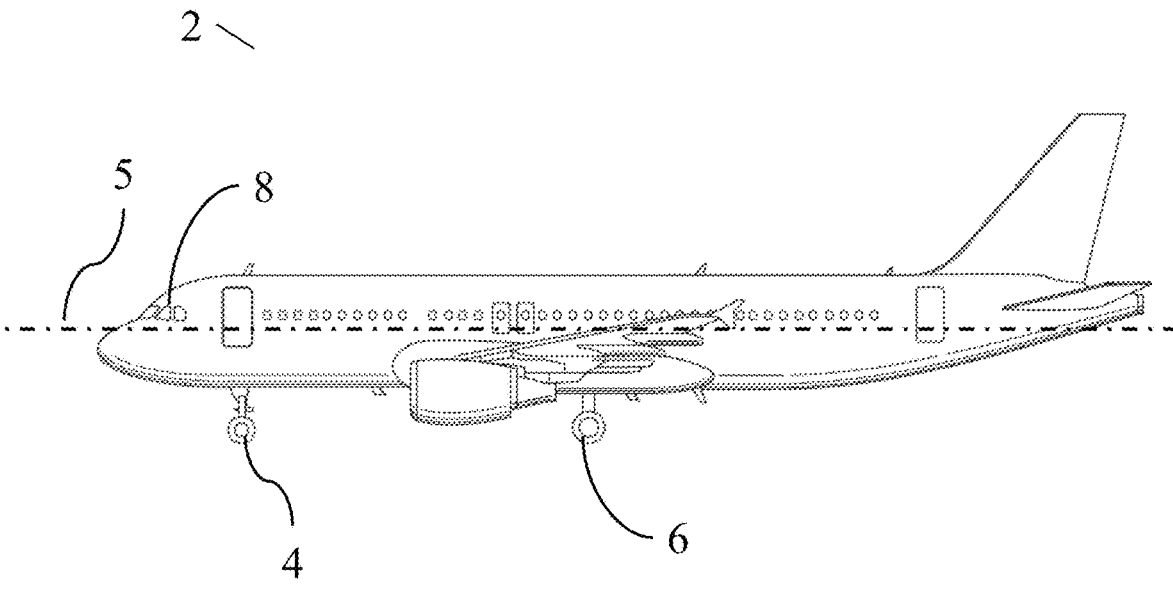
FIG. 1 shows a schematic view of an aircraft.

FIG. 1 shows a schematic view of an aircraft 2. The aircraft 2 comprises a nose landing gear 4, two main landing gears 6 (only one of which is shown in FIG. 1) and a cockpit 8. Within the cockpit 8 is located a device 10 to steer the nose landing gear 4, an interface 12 to receive information input by a flight crew and a display 14 to display information to the flight crew (all shown in FIG. 4). During movement of the aircraft 2 on the ground, such as when moving from a gate of an airport to a runway, an angle of the nose landing gear 4 relative to a longitudinal axis 5 of the aircraft 2 (also known as a roll axis of the aircraft 2) can be adjusted to alter a trajectory of the aircraft 2 (i.e. to turn the aircraft 2).

The angle of the nose landing gear 4 relative to the longitudinal axis 5 of the aircraft 2 (also referred to as the aircraft steering angle) is controlled by the flight crew from the cockpit 8 of the aircraft 2. The flight crew provides a steering input using the device 10, such as a tiller, in the cockpit 8 and the steering angle of the nose landing gear 4 is changed based on this steering input. When the nose landing gear 4 points towards a port side of the aircraft 2 (to the left-hand side of the aircraft 2 when facing forward from the cockpit 8) the aircraft steering angle is negative, and when the nose landing gear 4 points towards a starboard side of the aircraft 2 (to the right-hand side of the aircraft 2 when facing forward from the cockpit 8) the aircraft steering angle is positive. The nose landing gear 4 has a range of movement of between approximately −90 degrees and +90 degrees.

Figure 2:
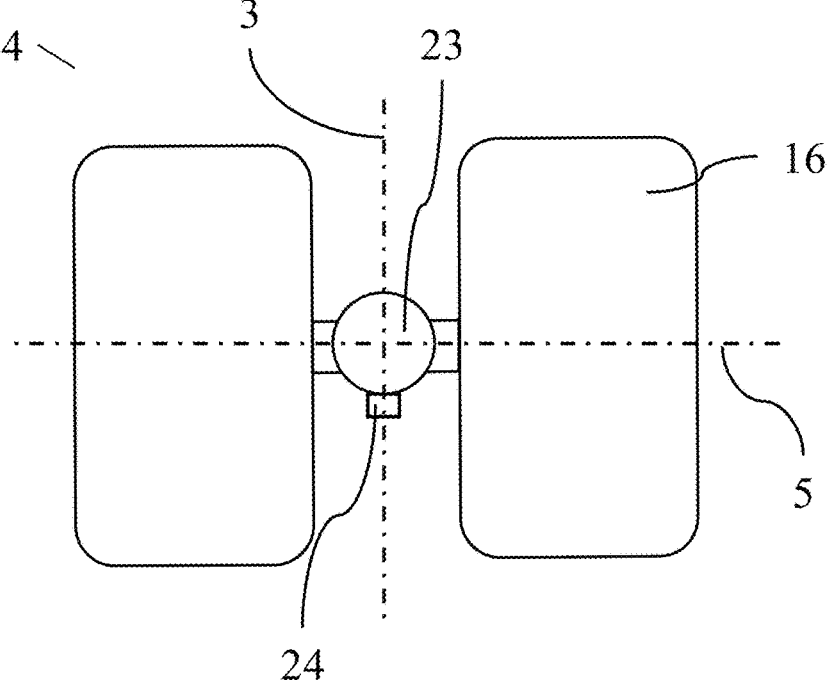
FIG. 2 shows a schematic plan views of a nose landing gear of the aircraft at a first aircraft steering angle.
Figure 4:
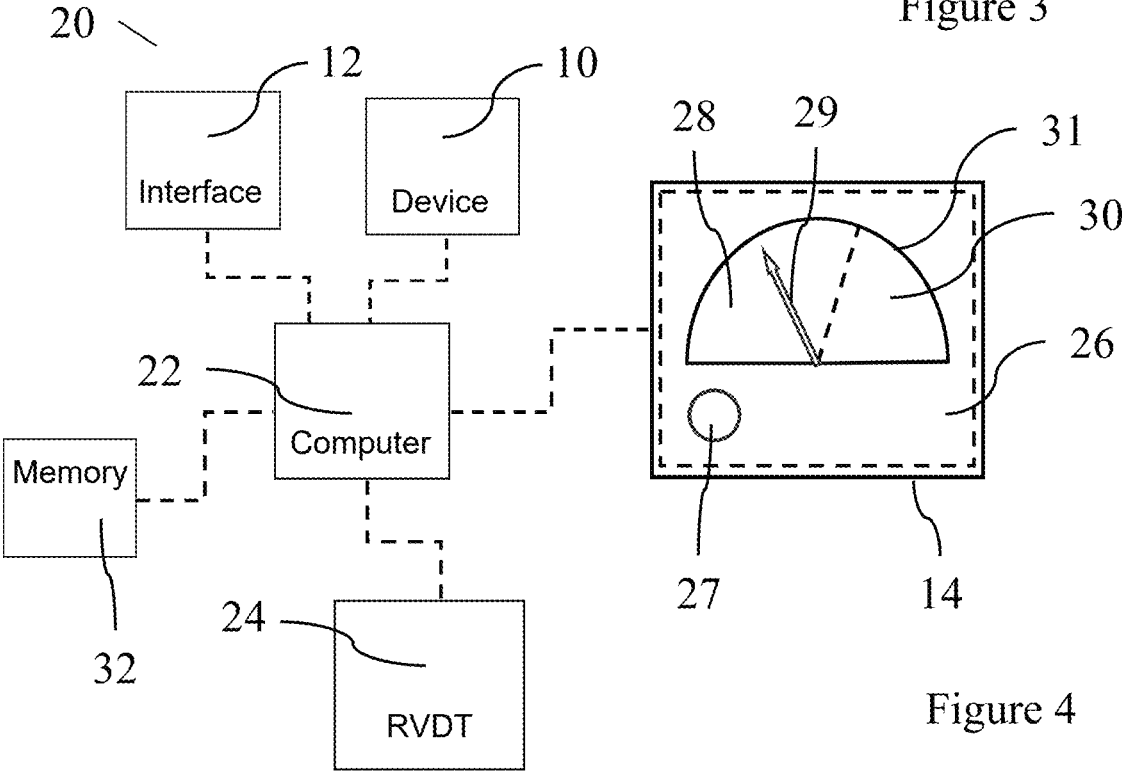
FIG. 4 shows a schematic view of a system.

FIG. 2 shows a schematic plan view of the nose landing gear 4. The nose landing gear 4 comprises a strut 23 to which is attached a rotary variable differential transformer (RVDT) 24 and two tires 16. The RVDT 24 is configured to measure rotation of the nose landing gear 4 which is indicative of the steering angle of the nose landing gear 4. In FIG. 4, the nose landing gear 4 has a steering angle of approximately 0 degrees. The nose landing gear 4 is orientated such that an axis of rotation 5 of the tires 16 is substantially perpendicular to a straight line 3 passing through the nose landing gear 4 that is substantially parallel to the longitudinal/roll axis 5 of the aircraft 2, meaning that when thrust is provided by one or more engines of the aircraft 2, the aircraft 2 will travel in a straight line.

Figure 3:
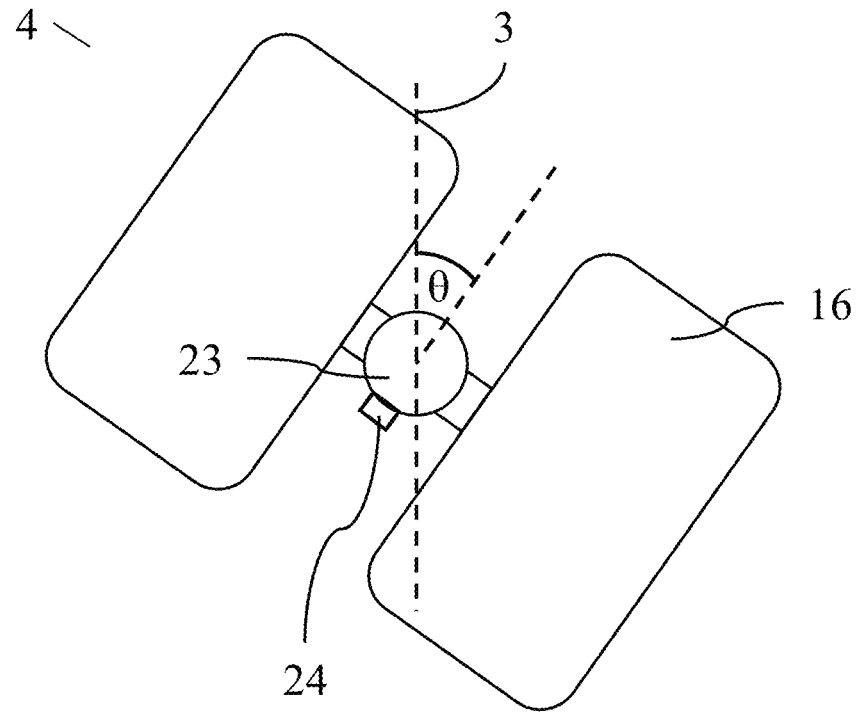
FIG. 3 shows a schematic plan views of a nose landing gear of the aircraft at a first aircraft steering angle.

FIG. 3 shows a schematic plan view of the same nose landing gear 4 as in FIG. 2 after a steering input has been provided by the flight crew such that the nose landing gear 4 has a steering angle θ of approximately +40 degrees relative to the straight line 3 passing through the nose landing gear 4 that is substantially parallel to the longitudinal/roll axis 5 of the aircraft 2. As such, the nose landing gear 4 points to the right and the aircraft 2 will turn to the right when thrust is provided by one or more engines of the aircraft 2.

As the steering angle of the nose landing gear 4 increases, the tires 16 of the nose landing gear 4 may experience an increase in forces (such as lateral forces) acting upon them, which may speed up degradation of the tires 16. To reduce the wear on the tires 16, the aircraft 2 includes a system 20 (as shown schematically in FIG. 4) to advise the flight crew when the steering angle is close to, or exceeds, a threshold above which degradation of the tires 16 of the nose landing gear 4 is expected to occur.

The system 20 is located on-board the aircraft 2 and comprises a computer 22, a memory 32 and the RVDT 24 that is attached to the nose landing gear 4. The system 20 also comprises the device 10, the interface 12 and the display 14 that are located within the cockpit 8. As discussed above, the device 10 comprises a tiller that allows the flight crew to steer the aircraft 2 by changing the steering angle of the nose landing gear 4 and the interface 12 is configured to receive information relating to the aircraft from the flight crew. Each of the RVDT 24, the device 10, the interface 12 and the display 14 are in communication with the computer 22. The computer 22 is configured to receive signals from the RVDT 24, the device 10 and the interface 12, and is configured to output a signal to the display 14.

The computer 22 is configured to receive a signal from the RVDT 24 that includes information indicative of the steering angle of the nose landing gear 4. The computer 22 is configured to compare the information received from the RVDT 24 against the threshold above which degradation of the tires 16 of the nose landing gear 4 is expected to occur.

Based on the comparison, the computer 22 is configured to cause an indication 26 to be output on the display 14 within the cockpit 8. As shown in FIG. 4, the indication 26 output on the display comprises a light 27. If the aircraft steering angle is determined by the computer 22 to exceed the threshold, the light 27 is configured to emit a red light, whereas if the aircraft steering angle is determined by the computer 22 to be below the threshold, the light 27 is configured to emit a green light.

To allow the flight crew to see when the steering angle of the nose landing gear 4 is nearing the threshold, the indication 26 output on the display 14 also comprises a gauge 31 comprising a needle 29 which moves from a first section 28 to a second section 30 as the steering angle of the nose landing gear 4 increases. The first section 28 corresponds to the steering angle of the nose landing gear 4 being below the threshold, while the second section 30 corresponds to the steering angle of the nose landing gear 4 being above the threshold. In some examples, at least one of the light 27 and the gauge 31 may be omitted.

While in the example of FIG. 4, the computer 22 is configured to cause the indication 26 to be output on the display, in other examples (as will be discussed further with respect to the method below) the computer 22 is configured to cause another action to be performed.

Figure 5:
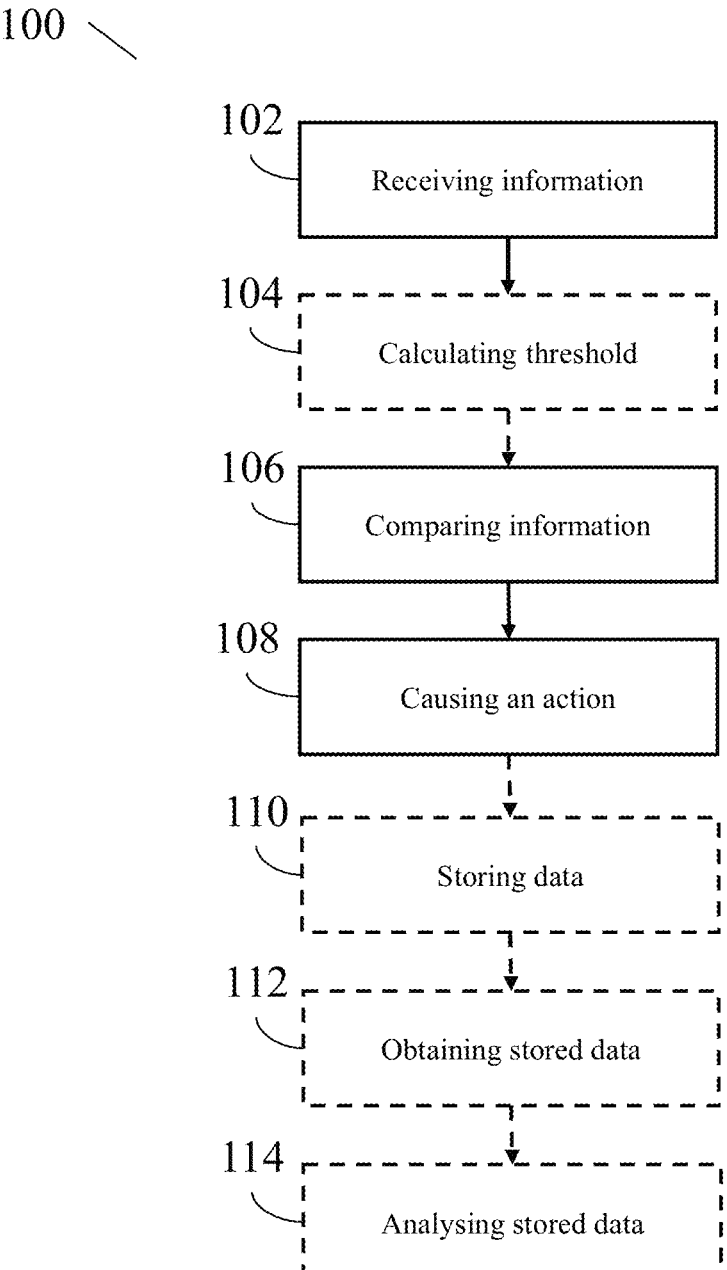
FIG. 5 shows a flow diagrams of a first method.

FIG. 5 shows a flow diagram of a computer-implemented method 100. The computer-implemented method 100 comprises receiving 102 information indicative of an aircraft steering angle. The information indicative of the aircraft steering angle is received by the computer 22 located onboard the aircraft 2. When using the system 20 discussed above in relation to FIG. 4, the information indicative of the aircraft steering angle is received from the RVDT 24 and is therefore indicative of a measured steering angle. The information received from the RVDT 24 also allows the computer 22 to determine a rate of change of the steering angle of the nose landing gear 4. By knowing the rate of change of the steering angle of the nose landing gear 4 is it possible for the computer 22 to predict what the steering angle of the nose landing gear 4 will be if the current rate of change is maintained.

The method 100 also comprises calculating 104 the threshold above which degradation of the tires 16 of the nose landing gear 4 is expected to occur. As the force on the tires 16 is affected by the weight of the aircraft 2 (amongst other factors), the threshold may change based on the weight of the aircraft 2. For example, the threshold may be larger when the aircraft 2 is lighter (such as when taxiing from the runway to the gate after landing) and may be smaller when the aircraft 2 is heavier (such as when taxiing from the gate to the runway for take-off). To account for this, calculating 104 the threshold comprises dynamically calculating the threshold based on the weight of the aircraft 2. Dynamically calculating the threshold comprises calculating the threshold for a given point in time based on factors affecting the threshold (such as the weight of the aircraft 2) at the same point in time. The calculation is therefore dynamic as the threshold changes when the factors affecting the threshold change.

When preparing for take-off or landing, the flight crew carry out a checklist which includes inputting into the interface 12 within the cockpit 8 information that is indicative of the weight of the aircraft 2 (such as the total number of people on board the aircraft 2 as well as the total amount of cargo and fuel loaded onto the aircraft 2). As the amount of fuel present on the aircraft will vary between take-off and landing (due to fuel being burned during flight), a fuel burn rate is also used to by the computer 22 to dynamically calculating the weight of the aircraft 2. The dynamically calculated weight of the aircraft 2 is then used to dynamically calculate the threshold.

As other factors, such as the ground speed of the aircraft 2 and the ambient environment of the aircraft 2 (such as weather conditions at the airport), also affect the force on the tires 16, determining 104 the threshold also comprises taking account of these factors. The computer 22 receives information indicative of the speed of the aircraft 2 from an aircraft system and receives information indicative of the ambient environment from an input made by the flight crew into the interface 12. In some examples, calculating 104 the threshold is based only on the weight of the aircraft 2.

While the threshold is discussed as being dynamically calculated in the above example, in other examples the threshold is a predetermined value that is stored in a database. In such examples, the computer 22 obtains the predetermined value of the threshold from the database.

After calculating the threshold, the method 100 comprises comparing 106 the received information against the threshold. The comparison is carried out by the computer 22 onboard the aircraft 2 and comprises determining whether the steering angle of the nose landing gear 4 is close to exceeding, or will exceed, the threshold. To determine when the steering angle of the nose landing gear 4 is close to exceeding the threshold, the computer 22 is configured to determine when the steering angle of the nose landing gear

4 is within a predetermined range of the threshold, which in this example is approximately 15 degrees below the threshold.

Based on the result of the comparison, the method 100 comprises causing 108 an action to be performed based on the comparison. In the example discussed above in relation to the system 20 of FIG. 4, causing 108 the action to be performed comprises causing an indication 26 to be output on the display 14. The computer 22 is configured to output a signal to the display to cause the indication 26 to be output. If the aircraft steering angle is determined to exceed the threshold, a red light is shown on the display 14, whereas if the aircraft steering angle is determined to be below the threshold, a green light is shown on the display 14.

As shown in FIG. 4, the indication 26 output on the display 14 also comprises a gauge 31 comprising a needle 29 that moves from a first section 28 to a second section 30 as the steering angle increases. The first section 28 corresponds to the aircraft steering angle being below the threshold, while the second section 30 corresponds to the aircraft steering angle being above the threshold.

As well as causing the indication 26 to be output on the display 14, causing 108 an action to be performed also comprises causing haptic feedback to be provided through the input 10 in the cockpit 8. Based on the result of the comparison, the computer 22 causes the device 10 to provide physical resistance to steering inputs that would exceed the threshold. As such, the flight crew will have to exert more force through the device 10 to exceed the threshold, ensuring that they are aware of when the threshold is being exceeded.

While in this example the display 14 is located in the cockpit 8 of the aircraft 2, in other examples, the display 14 is located external to the aircraft, such as in a towing vehicle that is used to tow the aircraft 2 while on the ground. In such an example, causing 108 the action to be performed comprises causing the indication 26 to be output on the display 14 located externally to the aircraft 2. The indication 26 may be any indication 26 as discussed herein.

The method 100 also comprises storing 110 data representative of at least one of the information indicative of the aircraft steering angle, the comparison and the action to be performed. The data is stored on the memory 32 that is located on-board the aircraft 2, although in other examples the data may be transmitted to a memory (not shown) located remote from the aircraft 2, such as at a control center.

The method 100 subsequently comprises obtaining 112 the stored data from the memory using the computer 22 and analyzing 114 the data on the computer 22. The data is analyzed to determine how often and for how long the threshold is being exceeded. This analysis may then be used to inform future operations of the aircraft 2 to reduce the amount of time that the threshold is exceeded. For example, if the analysis of the data indicates that the threshold is consistently being exceeded when taking a particular taxiing route, it may be desirable to modify the taxiing route or to request a different taxiing route. The analysis of the data may also be shared between different aircraft 2 within a fleet to reduce tire wear across the fleet. While in this example the analysis is performed by the computer 22 onboard the aircraft 2, when the data is transmitted to a memory remote from the aircraft 2, the analysis is also carried out on a computing device remote from the aircraft 2.

Figure 6:
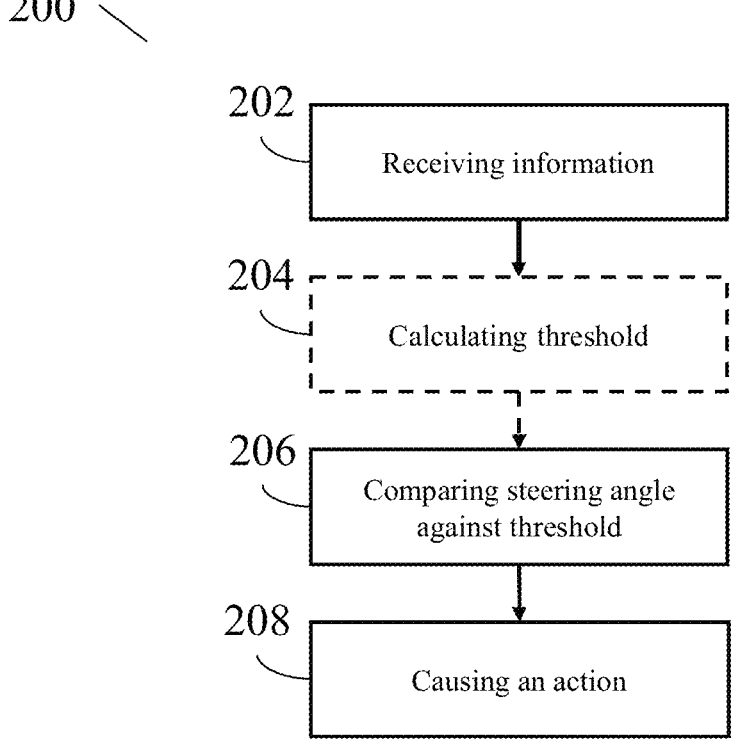
FIG. 6 shows a flow diagrams of a second method.

FIG. 6 shows a flow diagram of an alternative method 200. The method 200 comprises receiving 202 information relating to a cleared taxiing route of the aircraft 2 at the computer 22. When the aircraft 2 is due to taxi to and/or from the runway of the airport, the flight crew receives a cleared taxiing route from a ground controller at the airport. The cleared taxiing route includes information on which taxiways the aircraft 2 should take and therefore what turns will need to be made by the aircraft 2. This information is input into the interface 12 by the flight crew and the computer 22 is configured to receive this information and determine the steering angles of the nose landing gear 4 that would be required for the aircraft 2 to follow the cleared taxiing route.

The method 200 also comprises calculating 204 the threshold above which degradation of the tires 16 of the nose landing gear 4 is expected to occur. The threshold is calculated in the same way as discussed above in relation to the method 100 of FIG. 5.

The method 200 subsequently comprises comparing 206 the determined steering angles of the nose landing gear 4 that would be required to follow the taxiing route against the threshold. Based on the result of the comparison, the method 200 comprises causing 208 an action to be performed. The action comprises using the computer 22 to determine steering instructions which follow the taxiing route while minimizing the time spend exceeding the threshold and outputting the steering instructions on the display 14 within the cockpit 8. The steering instructions relate to steering inputs that should be made by the flight crew to cause the aircraft 2 to follow the cleared taxi plan while also minimizing the amount of time spent exceeding the threshold. The flight crew then input the steering inputs using the device 10 in the cockpit 8 to cause the nose landing gear 4 to steer the aircraft 2.

In some examples, instead of causing the instructions to be output on the display 14, causing 208 the action to be performed comprises causing the aircraft 2 to substantially autonomously taxi between the runway of the airport and the gate of the airport. In such examples, causing 208 the action to be performed also comprises outputting control instructions to an aircraft system that controls movement of the aircraft 2.

In another example, causing 208 the action to be performed comprises updating the taxiing route based on the result of the comparison. As discussed above, the taxiing route entered into the interface 12 by the flight crew includes information on which taxiways the aircraft 2 should take and therefore what turns will need to be made by the aircraft 2. The computer 22 compares the turns required by the taxiing route against the threshold and updates the taxiing route (and the instructions for following the taxiing route) such that, when the aircraft 2 follows the updated taxiing route, the amount of time that the aircraft steering angle exceeds the threshold is minimized or eliminated. The instructions for following the updated taxiing route are then output on the display 14 within the cockpit 8 of the aircraft 2 to allow the flight crew to follow the updated taxiing route.

In some examples of the methods 100, 200 described in relation to FIGS. 5 and 6, one or more of the steps of calculating 104, 204 the threshold, storing 110 the data, obtaining 112 the stored data and analyzing 114 the stored data may be omitted.

The methods 100, 200 and system 20 described herein make it possible to determine whether the steering angle of the nose landing gear 4 has exceeded, or will exceed, the threshold. This information can then be used to alter operation of the aircraft 2 to minimize, or eliminate, the amount of time that the steering angle of the nose landing gear 4 spends above the threshold. As a result of this, degradation of one or more tires 16 of the nose landing gear 4 may be reduced which may increase the overall lifetime of the tires

16. As the overall lifetime of the tires 16 may be increased, this may reduce maintenance costs associated with the nose landing gear 4 as the tires 16 may be replaced less frequently.

While in the above examples the aircraft steering angle is discussed in relation to the nose landing gear 4, in other examples the aircraft steering angle may comprise a steering angle of the main landing gear 6.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer-implemented method comprising:
receiving information indicative of an aircraft steering angle of an aircraft;
comparing the received information against a threshold above which degradation of a tire of a landing gear of the aircraft is expected to occur;
calculating the threshold dynamically based on one or more inputs from an aircraft system, wherein the one or more inputs comprises a weight of the aircraft; and
causing an action to be performed based on a result of the comparing.

2. The computer-implemented method according to claim 1, wherein the information indicative of the aircraft steering angle comprises a measured steering angle of the aircraft, or a steering input from a flight crew of the aircraft, or both.

3. The computer-implemented method according to claim 1, wherein the information indicative of the aircraft steering angle comprises information indicative of a taxiing route of the aircraft.

4. The computer-implemented method according to claim 1, wherein the information indicative of the aircraft steering angle comprises a rate of change of the aircraft steering angle.

5. The computer-implemented method according to claim 1, further comprising:
causing the action to be performed when the aircraft steering angle is within a predefined range of the threshold.

6. The computer-implemented method according to claim 1, wherein causing the action to be performed comprises causing an indication to be output on a display in a cockpit of the aircraft.

7. The computer-implemented method according to claim 6, wherein the indication comprises a light on the display in the cockpit of the aircraft and causing the action to be performed comprises further causing a property of the light to change based on the result of the comparing.

8. The computer-implemented method according to claim 1, wherein causing the action to be performed comprises providing instructions for steering the landing gear of the aircraft during a taxiing procedure of the aircraft.

9. The computer-implemented method according to claim 8, further comprising:
causing the instructions to be automatically carried out by one or more aircraft systems of the aircraft.

10. The computer-implemented method according to claim 1, wherein causing the action to be performed comprises providing haptic feedback on a device within a cockpit of the aircraft.

11. The computer-implemented method according to claim 1, wherein the one or more inputs further comprises at least one of a taxiing route of the aircraft, or an ambient environment of the aircraft, or one or more properties of the aircraft.

12. The computer-implemented method according to claim 1, wherein calculating the threshold comprises calculating the threshold based on information provided by a flight crew of the aircraft.

13. The computer-implemented method according to claim 1, further comprising:
storing, on a memory, data representative of the information indicative of the aircraft steering angle, the comparing, the action to be performed, or any combination thereof, as a stored data.

14. The computer-implemented method according to claim 13, further comprising:
obtaining the stored data from the memory using a computing device and analyzing the stored data on the computing device.

15. An aircraft system configured to:
perform the method according to claim 1.

16. An aircraft comprising:
the aircraft system according to claim 15.

17. A non-transitory computer-readable storage medium storing instructions that, when executed by an aircraft system, cause the aircraft system to carry out the computer-implemented method according to claim 1.

* * * * *